(12) United States Patent
Ling

(10) Patent No.: US 7,920,318 B2
(45) Date of Patent: Apr. 5, 2011

(54) PHOTOELASTIC MODULATOR SYSTEM

(75) Inventor: William Pui Ling, Glen Waverley (AU)

(73) Assignee: Endeavour Instruments Pty. Ltd., Glen Waverley (AU)

( * ) Notice: Subject to any disclaimer, the term of this patent is extended or adjusted under 35 U.S.C. 154(b) by 611 days.

(21) Appl. No.: 11/814,902

(22) PCT Filed: Jan. 25, 2006

(86) PCT No.: PCT/AU2006/000091
§ 371 (c)(1),
(2), (4) Date: Jul. 26, 2007

(87) PCT Pub. No.: WO2006/079168
PCT Pub. Date: Aug. 3, 2006

(65) Prior Publication Data
US 2008/0304133 A1 Dec. 11, 2008

(30) Foreign Application Priority Data
Jan. 28, 2005 (AU) ............................. 2005900362

(51) Int. Cl.
*G02F 1/11* (2006.01)
*G02F 1/29* (2006.01)
*G02B 26/00* (2006.01)
*G02B 26/08* (2006.01)

(52) U.S. Cl. .................. 359/285; 359/290; 359/298

(58) Field of Classification Search .................. 359/285, 359/290–295, 298
See application file for complete search history.

(56) References Cited

U.S. PATENT DOCUMENTS

| 4,468,086 | A | * | 8/1984 | Liu ..................................... 385/9 |
| 4,865,450 | A | * | 9/1989 | Munechika et al. .......... 356/489 |
| 5,130,843 | A |   | 7/1992 | He et al. |
| 5,744,721 | A |   | 4/1998 | Varnum |
| 5,841,538 | A | * | 11/1998 | Schoeffler et al. ............ 356/369 |

FOREIGN PATENT DOCUMENTS

| DE | 276996 | 3/1990 |
| DE | 299779 | 5/1992 |
| FR | 2528589 | 12/1983 |
| WO | WO-86/06505 | 11/1986 |
| WO | WO-99/47966 | 9/1999 |

\* cited by examiner

*Primary Examiner* — Ricky L Mack
*Assistant Examiner* — Brandi N Thomas
(74) *Attorney, Agent, or Firm* — Stites & Harbison PLLC; Douglas E. Jackson

(57) ABSTRACT

A photoelastic modulator (PEM) has two parts (11, 13) of the same or dissimilar cross sections, joined together to form an abrupt junction (16). A transducer, for which the natural oscillation is at the half acoustic wavelength mode, excites a longitudinal standing wave of high purity in the PEM. A feedback system is used to achieve stable phase synchronisation of multiple PEMs working at the same oscillation frequency, where the outputs of an amplitude and phase sensor for one PEM is used to correct phase variations of other PEMs and to compensate optical retardation errors.

39 Claims, 6 Drawing Sheets

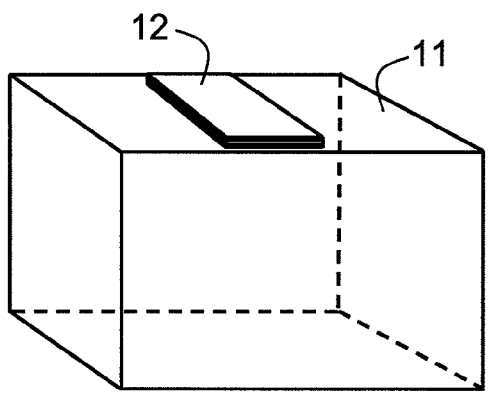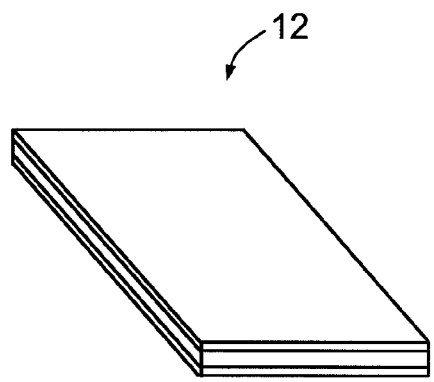
Fig. 1                     Fig. 2
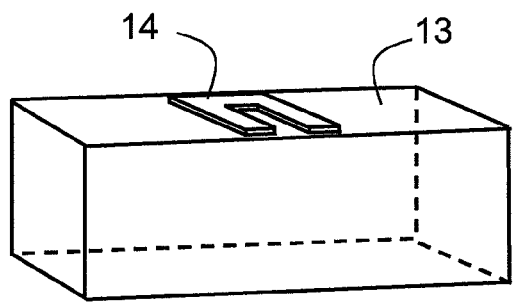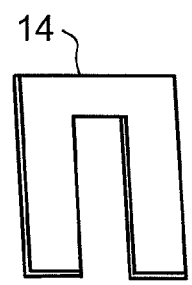
Fig. 3                     Fig. 4
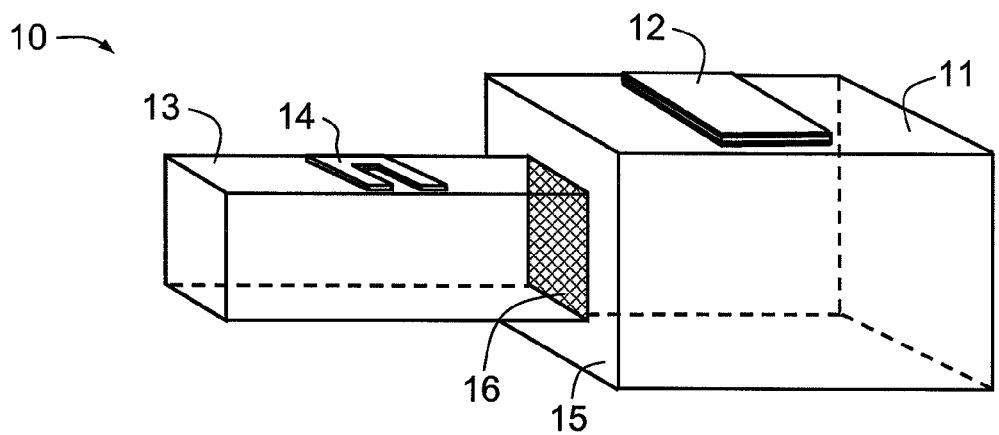
Fig. 5

PHOTOELASTIC MODULATOR SYSTEM

TECHNICAL FIELD

The invention describes a complete optical modulation system based on the photoelastic effect and is called photoelastic modulator (PEM hereafter). The invention provides highly stable and high precision optical modulation over a wide optical spectral range. In order to achieve stable synchronization of multiple modulators working at the same oscillation frequency with precise phase coherence, a novel method of phase extraction from the oscillating modulator is provided. With this phase synchronization, the application of photoelastic modulators (PEMs) is widely expanded.

BACKGROUND TO THE INVENTION

Modern photoelastic modulators (PEM) have been used extensively for scientific and technical measurements of optical quantities related to polarization states and optical birefringence. Examples such as strain inside optically transparent materials, dichroism measurements for the understanding of physical-chemical structures of a wide range of bio-medical and chemicals with out-of-symmetry molecular structures while the thickness of thin deposition films is especially important in the semiconductors industry. It is essential to investigate the principles and physical constructions of both designs to reveal the sources of the problems and provides a ground to understand the present invention.

The working principle of the modern photoelastic modulator (PEM) is based on the optical birefringence induced by periodical stress which is the result of acoustic standing waves built-up inside an optically transparent rectangular block, formed from an optically transparent material with a high elasto-optic efficiency and low mechanical dissipation (e.g. fused quartz). A longitudinal acoustic wave can be excited by an external driving source, when the frequency of the source satisfies certain conditions, the wave reflected back from the ends of the block will be constructive and built up a longitudinal standing wave. This standing wave will die down after the excitation source is removed. If the excitation continues (usually, physical contact with the exciting source is made), then a stable standing wave will be established. The periodic strain variation inside the optical block that builds up changes the refractive index of the region where the strain is at a maximum in the optical block with the same periodicity as the excitation. This optical block is then acting as a dynamic wave plate so, if a plane polarized light beam is passed through it at an appropriate angle, it's the beam's state of polarization is changed (or phase modulation) according to the degree of strain that is built up by the excitation of the external source.

The modern PEM was invented in 1969 by Dr. James Kemp (J. C. Kemp, Journal of the Optical Society of America, 1969, vol. 59, pp 950-954), then manufactured by a private company in the USA (Hinds Instruments, Inc., Hillsboro, Oreg., USA). The design has since been dominant in almost all PEM applications, yet the construction and performance have changed little. Its main disadvantage (of being sensitive to temperature and fluctuations in the working environment) has been the major hurdle that limits its applications.

A second type PEM was invented by Canit and Badoz of France in 1983 (Applied Optics, vol. 22, pp. 592, 1983), which utilized a thin slab of piezoelectric ceramic transducer adhered to the narrow side of a rectangular block of optical material (e.g. fused silica). The longitudinal standing (acoustic) wave is excited by the shear coupling of the ceramic transducer, the single block structure almost eliminates the temperature problem in the Kemp design, and is much more efficient in terms of transfer the electrical control signal to the resultant optical modulation.

There are however disadvantages which prevent the design from being widely used. Firstly, "shear coupling" introduces a series of complicated vibrations besides the longitudinal wave and, secondly, to make the shear coupling efficient, the thickness of the PEM body tends to be too thick, and makes the residual strain inside the optical block two to four times as much as the Kemp design.

In the PEMs described in the previous paragraphs, the fundamental acoustical oscillation frequency is the full wavelength mode, and the optical modulation is at the corresponding frequency. It is important to excite the fundamental mode with minimum unwanted perturbations. The Kemp design, utilizes a −18.5 degree X-cut quartz crystal as the excitation source, which delivers a nearly pure longitudinal wave that satisfies such a requirement. In the Canit-Badoz design, the shear coupling of the thin ceramic transducer induces a series of unwanted waves. A whole spectrum of acoustic vibrations was detected in the frequency domain, with resonance peaks spread over a wide spectral range. Although, the resonance peaks are positioned in different frequencies, and are transient, the waves and reflections will upset the purity of optical modulation.

OUTLINE OF THE INVENTION

It is an object of the present invention to utilize the high efficiency of a piezoelectric ceramic transducer such as that in the Canit-Badoz design, but prevent the unwanted waves and reflections from entering the optical modulation area such that the longitudinal standing wave is the dominant factor of optical modulation.

The invention provides a PEM having at least one abrupt junction or mechanical step which is introduced inside the PEM body and separates the PEM into two sections at such a step, and includes a transducer which is adhered on a block across the centerline of a longitudinal axis through the PEM forming an independent composite transducer in which the natural oscillation is at the half acoustic wavelength mode, the arrangement being such that a longitudinal standing wave is very easily excited.

It may be preferred that the standing wave be excited by an external electrical source with a corresponding frequency.

It may also be preferred that the standing wave be self excited by an appropriate electronic circuit.

It may be preferred that the transducer be a ceramic transducer which may be further preferred to be a piezoelectric ceramic transducer.

It may also be preferred that rather than a ceramic transducer being used that a transducer of an electrostrictive material be used.

The invention in another aspect provides a system for the phase coherent operation of a plurality of PEMs having electronics channels wherein a frequency generator provided with controller supplies a basic driving signal to all the PEM electronics channels, the system including the sending of a signal from the controller through a buffer amplifier to a phase comparator while the phase signal from the amplitude and phase sensor of another PEM is sent to the same comparator such that a resultant output (voltage) is a phase error signal that is used as a feedback component to correct phase variations of the other PEMs though a voltage controlled phase shifter.

It is preferred that the controller for the frequency generator be a digital signal processor (DSP). It may also be preferred that the controller include other electronic means such as microprocessors, programmable logic controllers (PLCs) and the like.

In order that the invention may be more readily understood embodiments of the invention will be described by way of non limiting example with reference to the accompanying drawings.

BRIEF DESCRIPTION OF THE DRAWING FIGURES

FIG. 1 is a perspective view of a driving block with a piezoelectric transducer adhered in the vicinity of maximum strain for a PEM according to an embodiment of the present invention;

FIG. 2 is a view of the thin slab piezoelectric transducer of FIG. 1, with conductive electrodes on either side;

FIG. 3 is a view of an optical block with a strain gauge in the vicinity of maximum strain for a PEM according to an embodiment of the present invention;

FIG. 4 is a view of the strain gauge of FIG. 3;

FIG. 5 is a view of a PEM according to an embodiment of the present invention;

DETAILED DESCRIPTION OF THE INVENTION

Figure 9:
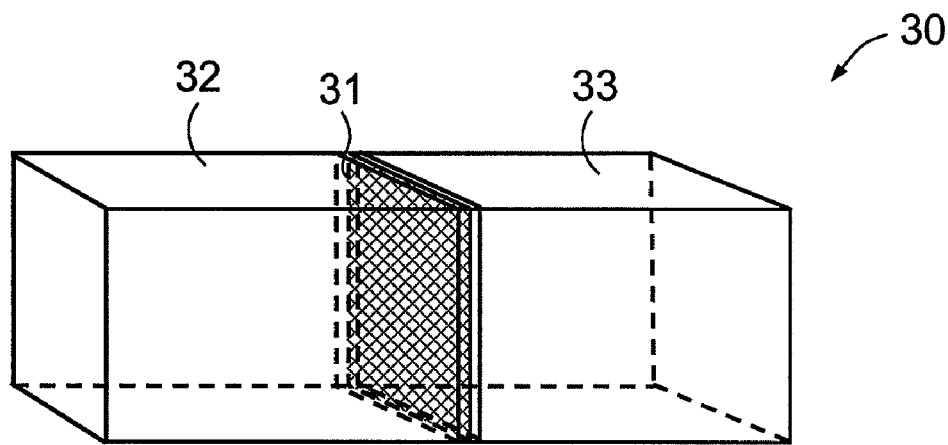
FIG. 9 is a schematic view of an abrupt junction between two blocks of equal cross-section of a PEM according to an embodiment of the present invention.

FIG. 5 is a schematic view of a PEM 10 according to an embodiment of the present invention, comprising a driver block 11 with a piezoelectric transducer 12 and a rectangular optical block 13 with a strain gauge sensor 14. Driver block 11 and optical block 13 have different cross-sectional areas and are joined at step abrupt junction 16. FIG. 9 is a schematic view of a PEM 30 according to another embodiment of the present invention (with transducer and sensor omitted), comprising a driver block 32 and a rectangular optical block 33. Driver block 32 and optical block 33 have the same cross-sectional area and are joined at step abrupt junction 31.

Figure 6:
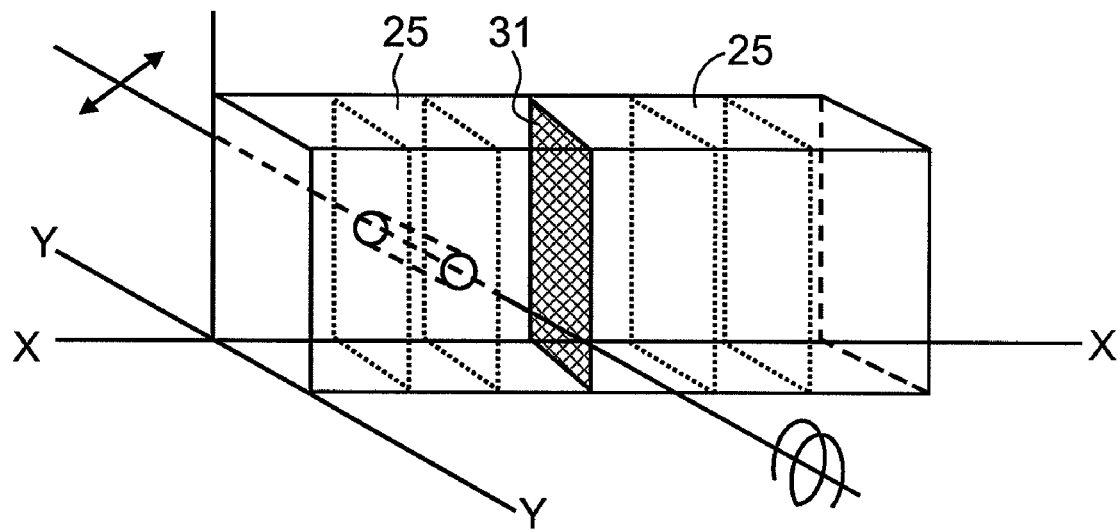
FIG. 6 is a schematic view of the two areas of maximum strain in a PEM according to an embodiment of the present invention, the change of polarisation of an optical beam passing through the optical block of the PEM, and the coordinate system employed herein.
Figure 7:
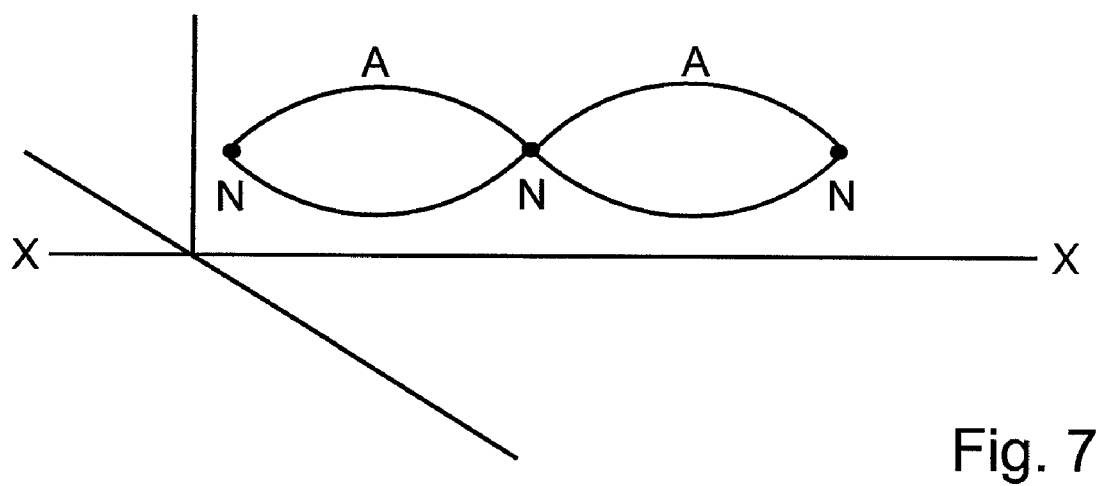
FIG. 7 is a schematic view of a longitudinal standing acoustic wave in a typical PEM.
Figure 8:
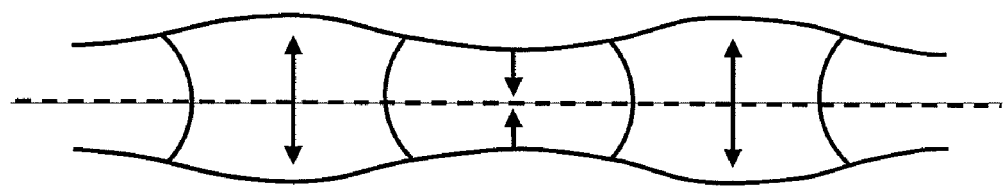
FIG. 8 is a schematic view of the transverse perturbation of a PEM created by the existence of the standing wave.

It is beneficial to define a coordinate system for the PEM blocks and the standing or stationary wave positions. In FIGS. 5 and 9 the major axis of PEMs 10,30 (horizontal from left to right in this view) is the longitudinal acoustic wave propagation axis just before the standing wave is established. As shown in FIG. 6, this axis is parallel to the ordinate of the coordinate system (viz. the X-X axis) and orthogonal to the plane of the step abrupt junction 16,31. Furthermore, the plane of step abrupt junction 16,31 is coincident with an node of the standing wave (shown at N in FIG. 7, in which A indicates an antinode). FIG. 8 is a representation of the transverse perturbation. The outward arrows represent the transverse extension of the blocks due to the action of the standing wave. Just before the standing wave is formed the propagating wave causing the extension is called a Lamb wave. In PEM 10 a composite transducer is referred to as the driver block 11 or the driving side of the PEM. To form PEM 10 with predicted optical characteristics, optical block 13 is adhered to one end of driver block 11. While the optical block can have a cross section which is the same as that of the driver block (cf. FIG. 9), it may be preferred that it has smaller cross-section, such as in the embodiment shown in FIG. 5.

Figure 11:
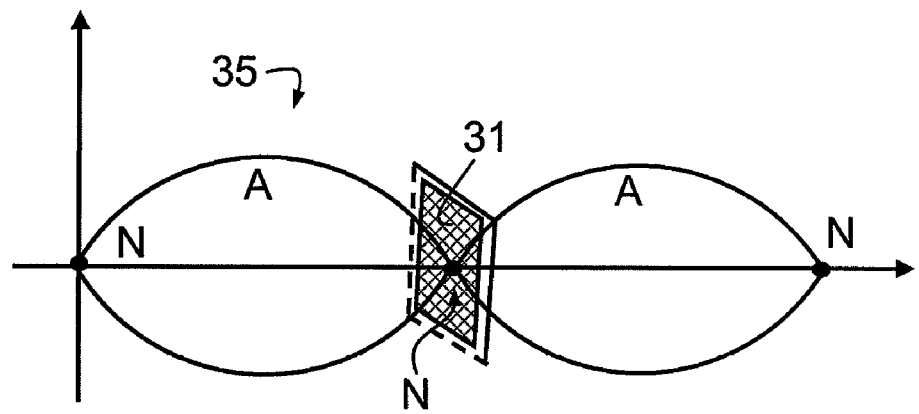
FIG. 11 is a schematic view of a standing wave in a PEM according to an embodiment of the present invention and the position of the abrupt junction.

The longitudinal standing wave induced into this optical block by the oscillation of driver block is again at the half wavelength mode, but PEMs 10,30 are so constructed that they will oscillate at a full wavelength mode as shown in FIG. 11 so that the resultant oscillation frequency will be very close to the natural frequency of the driver block but not identical, because of the condition of energy transfer between the blocks and the boundary conditions for the establishment of the new wave. The effect of such a junction 16,31 is to minimize the possibility of reflections and un-wanted acoustic waves entering the optical birefringence region.

At the same time, as in PEM 10 the cross section of optical block 13 is smaller than that of driver block 11, an acoustical "step horn" is formed, and a higher strain is expected in optical block 13 than the straight rectangular mono-block of the Canit-Badoz design. This result is equally well applied to the Kemp type PEM. In PEM 30 of FIG. 9, the abrupt junction 31 formed with a glue line between the blocks 32,33 causes more attenuation to the acoustic waves not parallel to the longitudinal axis but has a relatively minor effect on the longitudinal wave.

In these embodiments and those described below, the same material is used for both the driving and the optical blocks, which provides high stability of optical retardation against environmental temperature changes. This is not essential, however, particularly in certain cases where production cost is the dominant factor.

A PEM with multiple driving blocks can act on a single optical block. For circular and linear dichroism measurements, the induced strain by a single quartz crystal is unable to provide the necessary retardation in the longer wavelengths. Attempts had been made to increase the retardation by using two driver crystals one at each side of the optical block (J. C. Cheng, et. al. "Photoelastic modulator for 0.55-13 μm", Applied Optics, 15 (1976) 1960-1965). A similar arrangement was published in the Canit-Badoz paper but in a single block of fused silica. It is doubtful whether the latter design was actually workable, as heavy interfering waves from the two ends are unavoidable. The Kemp-Hinds octagonal PEM gives very high efficiency and pushes the limit to 18 μm in the infrared for circular dichroism measurements but the purity of longitudinal stress is yet to be proven. By incorporating a smaller cross-section optical block between two driving blocks, a much higher efficiency PEM is obtained, because of the separation of the unwanted interfering waves.

Figure 12:
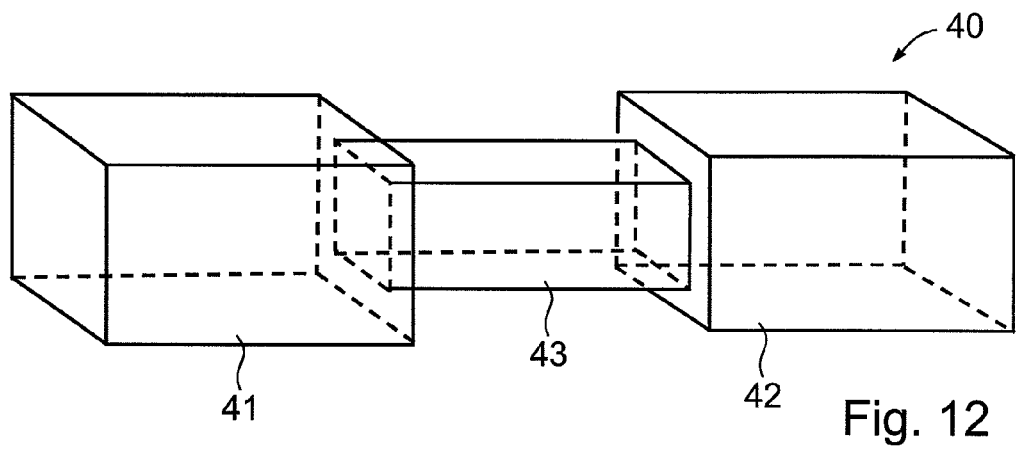
FIG. 12 is a schematic view of a dual driver PEM body according to an embodiment of the present invention where the light beam is to pass along a centre line rather than through one side of the PEM.
Figure 13:
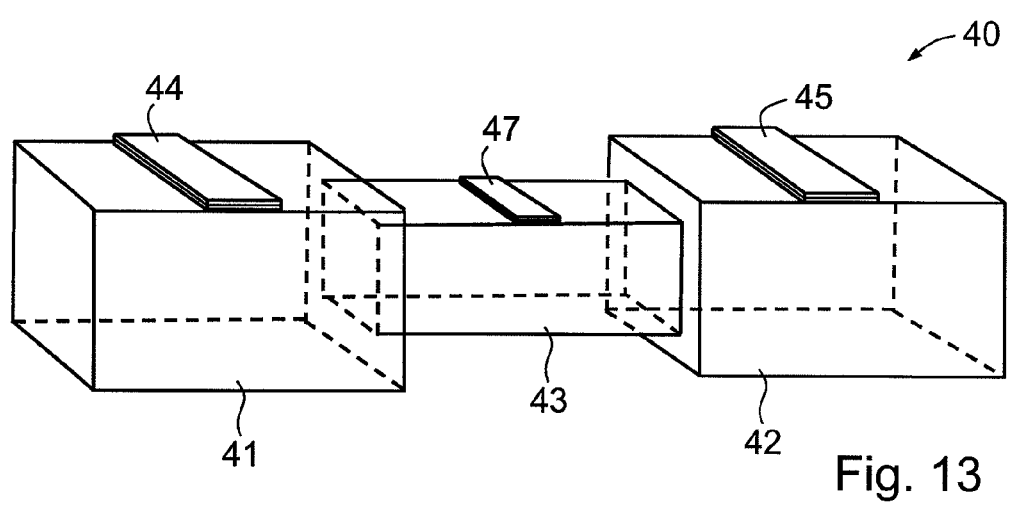
FIG. 13 is a schematic view of a dual driver PEM with piezoelectric amplitude and phase sensor in the optical block according to an embodiment of the present invention.

A dual driver PEM 40 according to an embodiment of the present invention is shown in FIG. 12 (with transducers and sensor omitted) and in FIG. 13 (with transducers 44,45 and sensor 47 shown). Two identical driving blocks 41 and 42 are adhered onto opposite ends of an optical block 43. A complex oscillation system is now formed and oscillates in a one and a half wavelength mode such that the oscillation frequency is the same as a single driving block at the same frequency in a half wave mode. The advantage of such a one and a half wavelength system is that the optical block is actually floating without direct contact between the supporting elements and the external world. For infrared applications nearly twice the optical retardation will be obtained with the same electronic driving.

Figure 14:
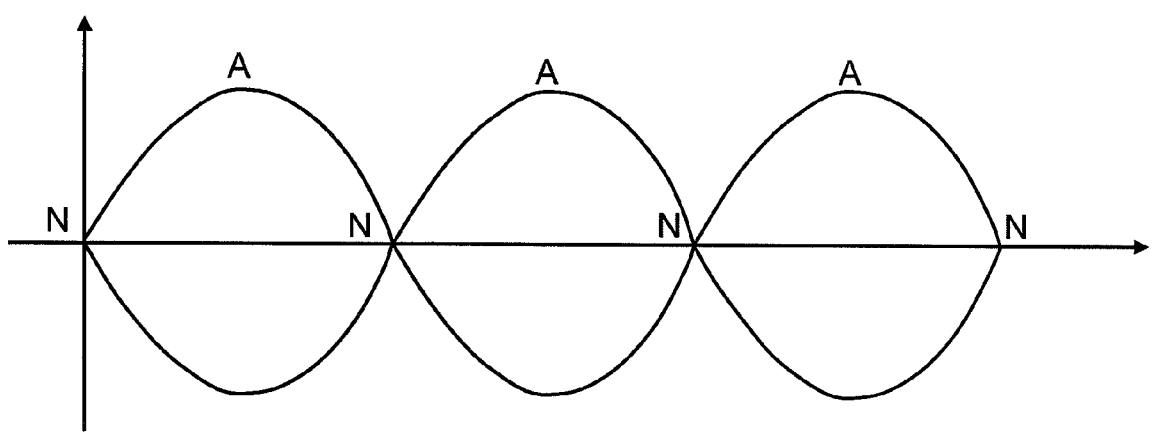
FIG. 14 is a schematic view of a one and a half wave standing wave in the dual driver PEM of FIG. 13.

The step abrupt junction formed in this way still retains the optimal physical symmetry. Referring to FIG. 13, transducers 44 and 45 are piezoelectric transducers, and the amplitude and phase sensor 47 is glued to optical block 43. FIG. 14 depicts the formation of the one and a half wavelength mode of the standing wave mode. N represents nodes and A the antinodes of the standing or stationary wave.

The present embodiments of the invention employ a number of electronic systems with different functions, which have five major requirements:
(1) To furnish a highly stable frequency source to drive the power electronics for the excitation of the natural oscillation of the PEM at the same time, to follow the small frequency change of the oscillation frequency of the PEM, mainly due to temperature variations, environmental and the minor self heating effect of the piezoelectric transducer.
(2)
In this invention, in order to synchronize two or more PEMs in a phase coherent mode, it is preferable to implement a preset controlled frequency generator. This frequency generator follows the natural oscillation frequency by the aid of a microprocessor or digital signal processor (DSP) to change the frequency of the generator. In the controlling sections, a first microprocessor or programmable logic controller (PLC) is programmed to process the temperature signal from a temperature sensor. The relationship between the change of oscillation frequency of the PEM versus temperature variations (temperature coefficient) is known by measurement for a particular PEM material, design and construction. By inputting the relationship into the microprocessor, which is followed by a high stability but controllable frequency generator, the natural oscillation frequency of the PEM can be followed at all working temperatures. Minor temperature changes due to the heating of the piezoelectric transducer are compensated for by the same microprocessor, by inputting into the microprocessor the driving level from the transducer providing the electronic driving.
(3)
A second microprocessor, PLC or DSP is installed to perform the amplitude control function to manage the input parameters, such as optical wavelength, optical retardation, refractive index dispersion vs. optical wavelength and other parameters which can be preset (e.g. the possible slowly ageing characteristics of the PEM).
(4)
An automatic feedback system to correct minor variations of the oscillation level of the PEM.
(5)
An automatic feedback system to correct the phase, or phase difference according to the pre-set phase relationship between two or more PEMs.

In the experimental regime, with equipment employing a PEM system, most of the controlling parameters interacting with the PEM system are determined by and set according to the experimental conditions. The preset conditions for the performance of the PEM do not respond to environmental changes that affect the precision and stability of the PEM system, though some are known to affect a PEM system in a fluctuating manner. Hence, PEM systems according to the invention provide more accurate, precise and repeatable experimental results by processing the two categories of parameters in separate channels, one in a preset manner and the other as automatic feedback controls as described in the above.

Furthermore, according to the present invention, a plurality of PEM units can work together in a frequency and phase synchronisation mode.

According to the present invention, the successful performance of the phase coherence or synchronisation of a plurality of PEMs is achieved based on the concept that only the relative phase between the individual PEMs is important and on the concept of separating the channels. The related electronics can be simple and straightforward. At this point the present invention will be compared to the prior art PEM described in WO9947966 (by Tudor Buican and Hinds Instruments, Inc.), which involved very complicated electronics and was not very successful.

The main problems of the PEM of WO9947966 were as follows:
(1)
Attempting to tune the frequency of an individual PEM driver while at the same time trying to match the phase to the other PEMs. A Voltage Control Oscillator (VCO) while providing a wide tuning frequency range fails to provide the necessary phase resolution at the same time and the phase stability of a VCO definitely does not satisfy the requirements of phase synchronisation.
(2)
Using temperature control to control the body temperature of the PEMs resonance frequency. The added optical components to isolate the PEM from the environmental temperature introduce unavoidable birefringence into the experimental optical path. In addition the automatic temperature control system would be very complicated and expensive as the PEM self-generated heat varies with its driven level and measurement of the temperature of the PEM would introduce complications in the PEM's resonance frequency and efficiency.
(3)
Use of a multiple feedback control loop. There is unavoidable interference between the loops.

(4)

Use of an electrical signal which was derived from the electrode of the quartz crystal driver. This is because the driving signal always appears at that point and the coupling of the acoustic oscillation on the optical block is sufficiently unknown that the true state of retardation and the phase relationship of the resultant optical modulation are usually not known.

(5)

The individual driving electronics have an impedance which is very unlikely to match the very small capacitance of the quartz crystal driver such that, even when the electronics are in phase this does not mean that the PEM oscillates in phase with it.

The approach of the present invention provide a better coupling scheme for the Kemp-Hinds PEM and a useful means of achieving phase synchronisation in that type of PEM. With a common frequency generation source, a controllable phase shifter inside an automatic feedback loop for each PEM electronics channel, it is able to control the relative phases between the PEMs to a high degree of precision.

In the embodiments of the present invention, the resonance character of the complete PEM is considered. When a PEM is mounted on resilient mounts, the mechanical quality factor (Q-value) is in the range of 3,000 to 10,000. There is a bandwidth that would tolerate more than ±1 Hz to ±3 Hz, for a PEM working at 50 kHz. It is considered that an open-loop control with microprocessor or DSP provides a more stable system.

The techniques of the present invention can be modified for application to the auto-oscillation system adopted by J. C. Kemp in his original 1969 paper (op. cit.), as is described below.

Details of the Electronics Control System

The stability" of a PEM system refers to the ability of the PEM to work consistently at a preset optical retardation irrespective of changes in optical wavelength, in environmental temperature and in optical refractive index while performing experiments. In a phase coherent PEM system, "stability" also refers to the stability of the phase relationship between PEMs.

A frequency generator is a mechanism for generating an electrical signal with a highly stable oscillation frequency that can be varied by external signal(s) and a highly stable output (to the level of 0.1% in amplitude). There are various electronics frequency sources that satisfy these requirements, such as digital frequency synthesizers, high stability tunable low frequency oscillators, and beat frequency oscillators with highly stable crystal frequency control elements.

Other considerations are as follows. A sinusoidal wave form is preferable (and square waveforms are to be avoided), because a steep leading edge will trigger more transients. Due to the temperature sensitivity of the optical materials of the PEM body, the natural oscillation frequency of these materials changes with ambient temperature. The frequency generator has to be able to follow these temperature changes to maintain frequency to within a narrow margin, and an external controllable generator, preferably controlled by a voltage delivered by the DSP, or other equivalent measure, is essential. In practice, a 0.5 to 1.0 Hz variation over the applied temperature range for a 50 kHz modulation frequency is considered acceptable. Owing to the natural resonance frequency of the common PEM materials (e.g. fused silica and ZnSe) in a 50 kHz PEM, the temperature coefficient is in the range of 1.8 to 3.0 hertz/degree C. A tuning range of 50 Hz is considered adequate.

Facilitating a 50 Hz tuning range, while retaining a frequency stability of ±1 Hz over±10 degrees Celsius, is a stringent specification for any frequency generation electronics. A single crystal oscillator oscillates at the PEM frequency of around 50 kHz, which means a pulling of frequency of up to 1,000 ppm, which is not considered practical. A beat frequency oscillator can be constructed with two quartz crystal oscillators, one voltage controllable (VCXO) and the other presettable with a natural frequency 50 kHz higher or lower than the VCXO. With a pair of crystals working at around 500 kHz, the tuning range of 50 Hz means 100 ppm, which is just inside the normal pulling range (i.e. the maximum attainable change in output frequency). On the other hand, to maintain a 0.5 to 1.0 Hz stability means 0.5 to 1.0 ppm over 20 degrees C., but a crystal of this class will be very expensive. In a preferred embodiment, a pair of crystals working at 1.0 MHz and 1.050 MHz is preferred, as they are readily available and inexpensive. The two oscillators can be encased within a simple temperature controlled oven (which is common for higher frequency crystal oscillators); such a frequency generator is practical for high stability PEM systems.

Alternatively, a high stability RC oscillator with very good temperature compensation, or oven-controlled, working at around 50 kHz may be employed. The tuning range requirement is about 1:1,000 and is achievable by modern electronic circuitry with good resolution, down to a fraction of one hertz. One advantage of RC oscillators is that it is easy to regulate the amplitude of oscillation to a high degree with minimal distortion. The digital frequency synthesizer is versatile, and can be highly stable.

It is desirable to provide temperature sensor positioned in close proximity or in contact with the optical block of the PEM, to monitor the ambient temperature. In special cases, a plural of sensors can be installed at different positions. The natural oscillation frequency of the PEM can be determined as a function of temperature, and as its value is constant for a particular optical material and PEM construction, so there is a one to one correspondence between temperature and required frequency change. When the PEM is driving hard (high retardation or longer wavelengths) temperature rise is unavoidable, but the electronic driving level can be fed to the microprocessor to compensate for the minor temperature change.

It is desirable to provide one or more oscillation amplitude sensing devices, placed in the vicinity of maximum strain caused by the built-up of standing waves inside the body of the PEM. In terms of acoustic wave propagation, the optical block 13,33,43 of the PEM 10,30,40 is considered a short plate, with its length equal to one acoustic wave. The longitudinal standing wave causes considerable transverse perturbation in the vicinity of the maximum stress. The present inventor has found that this type of perturbation follows the amplitude of the standing wave linearly over a wide amplitude range, and is convenient for the sensing of both the amplitude and phase of the standing wave. This relationship is, according to the present invention, applied directly to the sensing of the optical retardation. The "vicinity" of maximum stress is a relative term as that vicinity covers a considerably wide volume of the optical block (D. Yang, et al, "Photoelastic Modulator: Polarization Modulation and Phase Modulation", J. Optics (Paris), 1995, vol. 26, ppl 51-159). FIG. 6 shows the stress and oscillation amplitude distribution of the longitudinal standing waves in PEM 30 (of FIG. 9), including the vicinities 25 of possible sites for the installation of the sensor(s). According to requirement, the sensor(s) can be either in contact with or not-in-contact with the PEM body. There are various types of sensors that can be used, such as (1)

strain gauges, (2) piezoelectric transducers, especially, quartz transducers, (3) capacitive sensors, (4) magnetic sensors, and (5) photoelectric sensors, in the vicinity of the maximum stress regions. The present inventor found that the transverse perturbation in the vicinity of the maximum stress is an effective way to sense the amplitude and the phase of the oscillation of the PEM.

Different types of strain gauges can be used, including the ordinary metal foil, semiconductors, and micro-machining versions. A direct deposition of strain gauge material on to the required position of the body of the PEM will cause minimum interference in performance.

With piezoelectric sensors, a thin and elongate slab of piezoelectric material with low temperature sensitivity is suitable. A +5 degree or −18.5 degree X-cut quartz crystal is most suitable for its small mass, very high temperature stability and ease of adherence in position. Other piezoelectric or electrostrictive materials can be used, but the advantage of using piezoelectric ceramic PZT or other modern piezoelectrics of electrostrictive materials is the higher output signal which significantly improves the signal to noise ratio and provides better reliability at lower optical retardation settings. In practice this type of sensor is preferable to strain gauges as, exploiting the availability of the modern low residual strain adhesives for gluing the sensor in position, they have less mass than the ordinary strain gauges with simpler electronics.
Application of the Present Invention to Auto-Oscillation PEM Systems The present invention provides a new insight into the traditional auto-oscillation scheme of electrical excitation. Almost all laboratory made PEMs were designed along lines similar to the PEMs of the original publications of J. C. Kemp. It is advantageous to modify the driving electronics of such PEMs according to the present invention. The amplitude and phase sensor provides information for the establishment of a positive feedback loop to creates auto-oscillation of the PEM. A simple band-pass filter at the PEM oscillation frequency is provided to extract the signal from the sensor. A simple electronic amplifier provides gain to sustain the oscillation. To apply the wide adjustable range in PEM oscillation amplitude to the required optical retardation, in most practical designs it has been assumed that the PEM is perfectly linear; thus, with a square wave generator, the voltage applied to the PEM uniquely determines the degree of optical retardation. In fact, however, the calibration can run out to an unacceptable degree.

By applying the techniques of the present invention to the auto-oscillation method, all the predictable parameter values can be fed to the DSP, the output of which is a control signal to control the voltage of a high stability power supply. In such an arrangement the supply voltage to the auto-oscillation loop can be pre-programmed with the predictable parameters as previously described; with the amplitude sensor installed, minor fluctuations of optical retardation can be corrected, and a sinusoidal amplifier system can be implemented to avoid the unwanted oscillations inside the PEM that otherwise exist in square wave driving systems. In a practical system, the electronics are similar to the examples of the preferred embodiments of the present invention.

The Techniques of the Present Invention Applied to Prior Art PEMs
Improving the Kemp PEM The piezoelectric crystal quartz driver block in the Kemp PEM furnishes the nearly pure longitudinal wave for the optical modulation. The very low capacitance (typically 10 picofarad) considerably limits the efficient transfer of driving electrical power to the PEM. Attempts had been made to increase the efficiency by using electromagnetic transformers to raise the driving voltage (Shigeo Hayashi, "A Versatile Photoelastic-Modulator Driver/Controller", Japanese Journal of Applied Physics, vol. 28, 1989 pp 720-722) but no electrical impedance matching was mentioned. To implement the techniques of the present invention to such a PEM system, the present inventor suggests the use of a piezoelectric transformer inserted between the electronic driver's output and the quartz crystals electrodes, directly or with a simple inductance, capacitance network to provide good impedance matching. Besides better impedance matching the piezo transformer supplies the high voltage and isolates the associated current from the rest of the electronics.

FURTHER DESCRIPTION OF PREFERRED
EMBODIMENTS OF THE PEM SYSTEM OF THE
INVENTION

PEM 10 described above is manufactured as follows. A rectangular bar of fused silica is used as the driving block, and is ground to appropriate dimensions such that its natural acoustical resonance frequency of longitudinal standing waves is at half of a wavelength mode. It is designed such that the X-axis is the main axis of the resultant PEM (cf. FIG. 6). A thin slab of piezoelectric ceramic material PZT is cut to appropriate size then is glued in position on driver block 11 as shown in FIGS. 1 and 5, with a strong adhesive.

A rectangular bar of optical material, with optical transmission appropriate for the applied optical wavelength, is ground to the desired dimensions of the optical block 13 such that the natural acoustical resonance frequency of longitudinal standing wave is at the half wavelength mode (illustrated at 35 in FIG. 11), and equal or approximately equal to the frequency of driver block 11 with adhered transducer 12.

Figure 10:
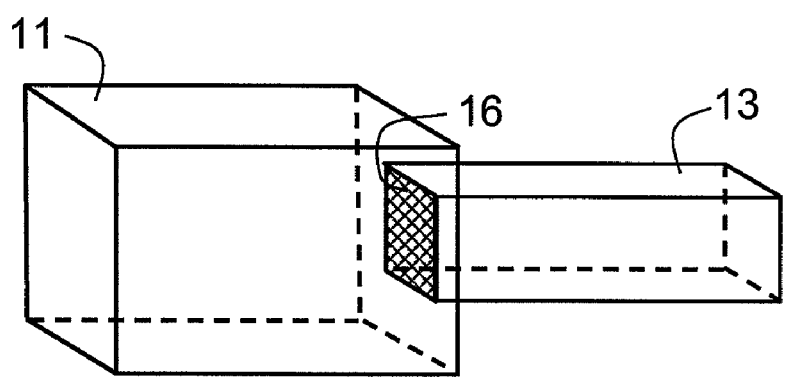
FIG. 10 is a schematic view of an abrupt junction between the two blocks of a PEM according to an embodiment of the present invention in which one block has a smaller cross-section than the other.

In this embodiment, fused silica is suitable for the optical spectral range of UV to near IR. With the same coordinate system as that shown in FIG. 6, the dimensions of the optical block of the embodiment of FIG. 5 are different from those of the driving block; as is apparent from FIGS. 5 and 10, the cross-section of the optical block 13 of PEM 10 is smaller in the Y-Z plane, to build-up the mechanical step and abrupt junction that minimizes the transmission of unwanted waves from penetrating from driver block 11 to optical block 13. On optical block 13, at the vicinity of maximum stress, an alloy strain gauge sensor 14 is deposited on (in this view) the upper surface of optical block 13, which is in the X-Y plane. Electrical connections are attached to the terminals of the sensor 14 and terminated at an electrical socket on the body of the PEM housing (not shown).

Referring to FIG. 9, PEM 30 is built by adhering optical block 33 to driving block 32 with resilient and low shrinkage adhesive, to minimize the possible residual strain effect on the modulation area. The centre line of optical block 33 is brought to coincide with centre line of driving block 32 along the X-axis (cf. FIG. 6) during the gluing process.

Figure 15:
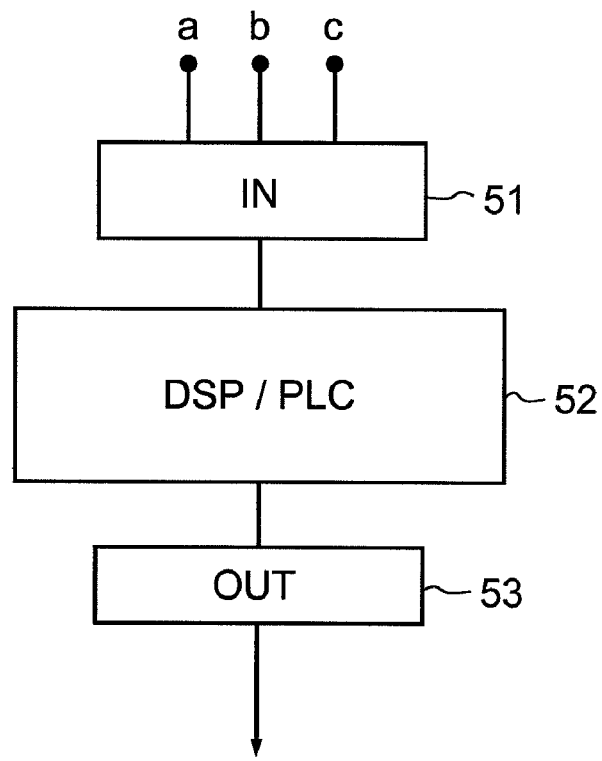
FIG. 15 is a schematic view of a frequency controlling system comprising a first digital control processor for the control of the high stability frequency signal for driving a PEM according to an embodiment of the present invention.

FIG. 15 is a schematic view of a frequency controlling system according to an embodiment of the present invention, for controlling the high stability frequency signal for driving a PEM, and comprising a first digital control processor 52 with its input and output interfaces 51, 53. First digital processor 52 comprises a simpler type microprocessor, DSP or PLC, and is used to control the frequency output of the high stability frequency generator. The basic generator also possesses very high amplitude stability with low distortion. As previously described the main influence to the oscillator frequency is the temperature of the PEM. A temperature sensor located near the PEM body provides a reference to first digital control processor 52, which sends a voltage to control the frequency of the basic frequency generator. Parameters such as minor temperature rises due to the higher amplitude driving of the transducer on the PEM, particularly in the infra red region, can also be fed in. As the temperature coefficient of the longitudinal wave velocity differs with different construction materials for the PEM, the temperature rise versus driving level is a function of the piezoelectric ceramic transducer and the bulk of the driver block. All these parameters can be stored in a database.

Figure 16:
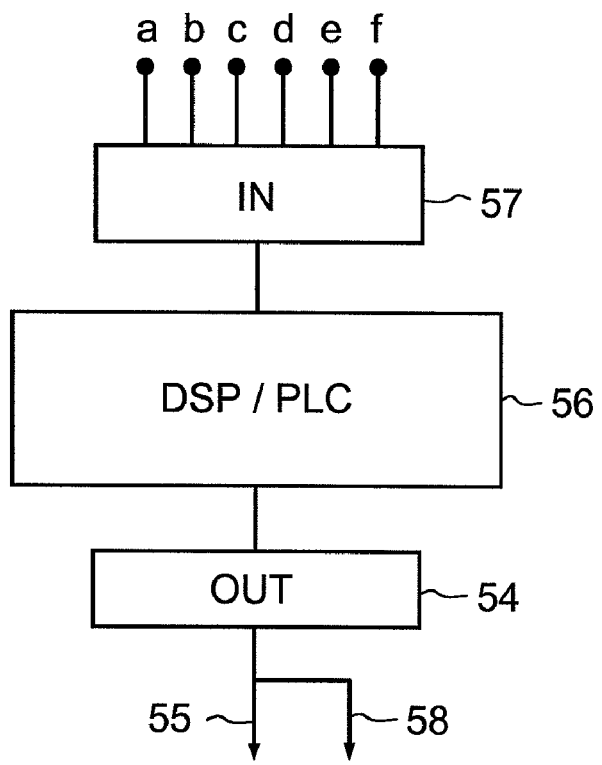
FIG. 16 is a schematic view of an amplitude controlling open-loop system comprising a second digital processor for providing the correct driving level to drive the PEM before final automatic compensation according to an embodiment of the present invention.

FIG. 16 is a schematic view of an amplitude controlling open-loop system according to an embodiment of the present invention, for providing the correct driving level to drive the PEM before final automatic compensation, and comprising a second digital processor 56 with its input and output interfaces 57, 54. Electrical signals indicative of the preset parameters, such as the required optical retardation and the optical wavelength signal from the spectrometer, are fed to terminals a, b, c, d, . . . etc. of the input interface unit 57 of second digital processor 56 (though second digital processor 56 may be manually set for calibration purposes). The dispersion of the optical refractive index of the optical block can also be fed and compensated for. Any other parameter not of time varying nature also can be entered, to make the optical retardation as close as possible to the ideal value.

Second digital control processor 56 comprises a DSP (or other suitable data processor) and has an output interface 54, with output terminals 55 and 58. The programmed signal of second digital control processor 56 is the most appropriate signal for driving the PEM. However disturbances affecting the performance of the PEM should desirably be compensated for. In the present embodiment a feedback control loop is formed by an amplitude and phase sensor. The signal thus generated is sent to a string of electronic stages and eventually automatically adjusts the power to the PEM to optimize its performance.

For varying parameters, such as environmental temperature changes, a feedback amplitude control channel is implemented to fine tune the optical retardation.

Figure 17:
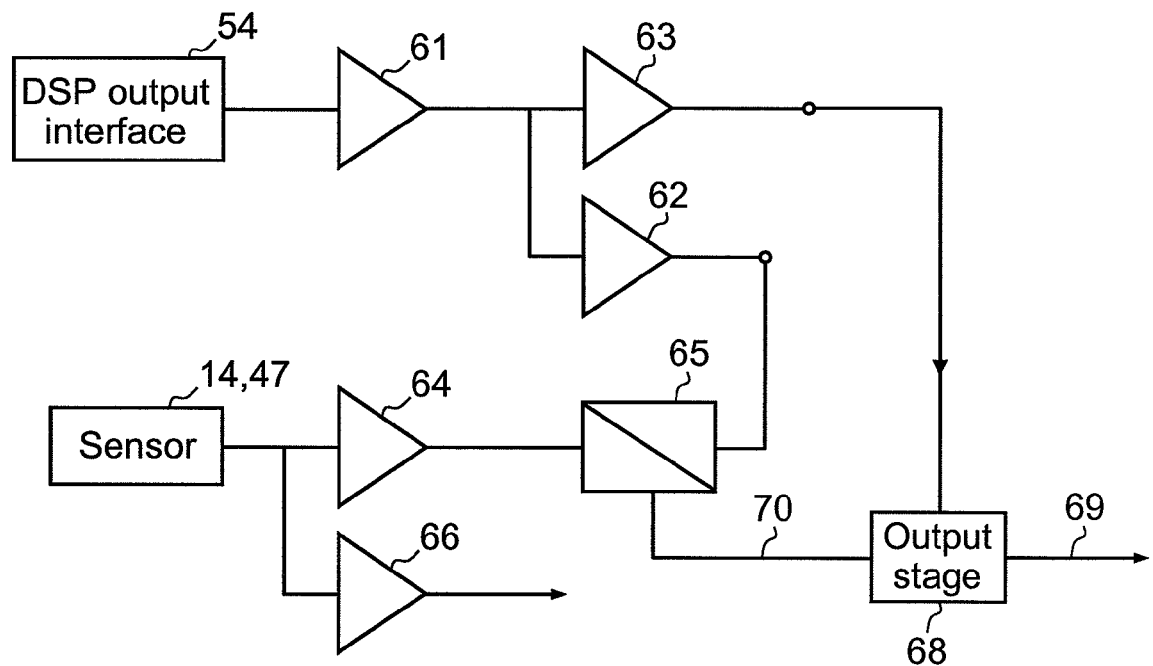
FIG. 17 is a schematic diagram of the automatic compensation circuit for amplitude control according to an embodiment of the present invention, which receives the output of the second digital processor of FIG. 16.

As shown in FIG. 17, signals from output terminal 58 or 55 of output interface 54 of second digital control processor 56 are fed to a chain of buffer amplifiers 61, 62 and 63. Buffer amplifier 62 outputs a replica of the signal from second digital control processor 56 but with a somewhat higher amplitude. This signal constitutes a reference signal of the required amplitude for comparison by signal comparator 65 with the signal from amplitude and phase sensor 14,47 (fed to signal comparator 65 via buffer amplifier 64). Signal comparator 65 may comprise a multiplier/divider that compares the two signals, or some other functional circuit that finds the difference between the two signals, and generates an error signal. This error signal is fed into an amplifying output stage 68 comprising a voltage controlled signal divider or electronically controlled potentiometer, the amplified output 69 of which is the driving signal for the PEM.

Buffer amplifier 63 is a buffer stage for feeding the reference signal to output stage 68 for presetting the signal divider or potentiometer of output stage 68, or the gain of output stage 68. Output 69 of output stage 68 is coupled to the PEM's driving transducer. Amplitude and phase sensor 14,47 is adhered to the PEM, so any residual error detected at signal comparator 65 will drive the PEM to the required level owing to negative feedback. This automatic control process endeavours to maintain signal comparator 65 with a null output.

This functional electronic circuit can be replaced with a gain controllable amplifier and its associated circuits. The electronics so described can be performed by digital or analogue mechanisms.

Phase Sensing, Phase Control, and Phase Coherent Synchronization of Plural PEMs

Figure 18:
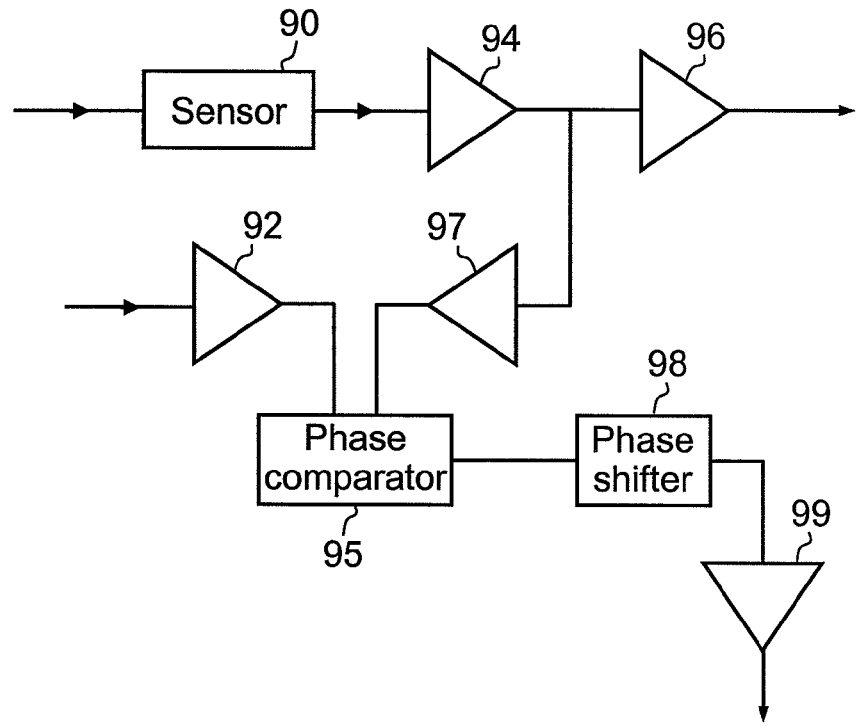
FIG. 18 is a schematic diagram of the electronics for performing a PEM synchronisation operation according to an embodiment of the present invention.

An important achievement of the present invention is the phase coherent operation of multiple PEMs. A circuit for effecting this technique according to a preferred embodiment of the invention is shown in FIG. 18.

To provide phase synchronisation between two or more PEMs without employing a phase locked loop, according to this embodiment a signal derived from a common source is used, specifically in this embodiment the controlled frequency generator for the PEM. The electronics of each PEM channel include a phase shifting circuit. Although all the PEMs have equal status in terms of optical performance and as receptors for the electronic driving power, one PEM (PEM1 hereafter) and its driving electronics is designated a reference channel, or channel 1. This channel has a preset phase related to the input signal of output terminal 58 of output interface 54 of second digital processor 56. The signal picked up from the PEM oscillation by phase and amplitude sensor 14,47 is fed to certain buffer and amplifier stages and then into a second and any other PEM channels (termed controlled channels) as a reference. Each of the controlled channels has a respective comparator and phase shifter. As shown in FIG. 18, the signal from amplitude and phase sensor 90 of PEM1 is amplified with buffer amplifier 94 to provide a reference signal. In the present example, this reference signal and the phase signal of a second PEM, after passing through amplifying stages 92 and 97 respectively, are fed to a phase comparator 95, the output of which is fed into a phase shifter 98.

Thus, to perform phase synchronisation amplitude and phase sensor 90 of PEM1 of channel 1 is buffered and amplified though buffer amplifier 94 to provide a reference signal, which is buffered and amplified though buffer amplifier 97, then fed to the first input of phase comparator 95; additional buffer amplifier 96 is for additional PEM channels. The signal from the controlled channel (viz. channel 2) corresponding to a second PEM (PEM2) is processed similarly to that of channel 1, with buffer and amplifier stage 92, and is fed to the second input of comparator 95. The output of comparator 95 reflects the difference between the phase of PEM1 of channel 1 and PEM2 of channel 2. A phase shifting circuit in channel 2 is a controllable phase shifter equivalent of the preset phase shifter of the reference channel. As a result of this design the above electronic circuitry can be inserted between the output of the automatic amplitude control and the final power amplifier or any other convenient place.

In order to minimise any drift of phase by the phase shifting circuit it is preferable that the phase shifting circuits be identical. The phase difference signal, usually a dc voltage, from phase comparator 95 is amplified or buffered and fed into the controlling terminal of the phase shifter 98 of channel 2. Electronically the higher the voltage from the phase comparator 95 the larger the phase change that is needed from the channel but in the opposite direction such that the resultant sensor output of channel2 has a signal which drives PEM2 with a phase closer to channel 2. This process will repeat until the difference in phase is zero or minimized. Other PEM channels behave similarly and all refer their phase to channel 1.

This process can be performed either by a digital or analogue mechanism.

While specific examples of the invention have been discussed herein it is to be understood that variations in and modifications of the features of these can be made while still lying within the spirit and scope of the invention.

The claims defining the invention are as follows:

1. A PEM comprising:
   a body in which a longitudinal standing wave is excited, said body having
   a first section comprising a driver block,
   a second section comprising an optical block, and
   a junction or mechanical step dividing said body into said driver block and said optical block; and
   at least one amplitude and phase sensor located in an area of maximum strain of the body.

2. A PEM as claimed in claim 1 wherein said first and second sections comprise blocks of the same material.

3. A PEM as claimed in claim 1, comprising a composite transducer comprising a transducer adhered to said driver block across a longitudinal axis of the body.

4. A PEM as claimed in claim 3, wherein a standing wave is excited by an external electrical source with a corresponding frequency.

5. A PEM as claimed in claim 3, wherein a standing wave is self-excited by an electronic circuit.

6. A PEM as claimed in claim 4, wherein said transducer is a ceramic transducer.

7. A PEM as claimed in claim 6, wherein said transducer is a piezoelectric ceramic transducer.

8. A PEM as claimed in claim 4, wherein the transducer is of an electrostrictive material.

9. A PEM as claimed in claim 1, wherein a transverse perturbation is used in evaluating wave amplitude and phase.

10. A PEM as claimed in claim 1, wherein said amplitude and phase sensor is installed on either the optical block or the driver block of the body.

11. A PEM as claimed in claim 1, comprising a powering circuit that receives a frequency signal from a frequency generator.

12. A PEM as claimed in claim 1, wherein the optical block has a smaller cross-section than that of the driver block at the abrupt junction or mechanical step.

13. A PEM system, comprising:
    a frequency generator;
    a first controller for controlling said frequency generator;
    a reference channel having a reference PEM comprising at least one junction or mechanical step within a body of said PEM which divides said PEM into two sections, and including an amplitude and phase sensor; and
    at least one other channel having a PEM comprising at least one junction or mechanical step within a body of said PEM which divides said PEM into two sections, and including an amplitude and phase sensor, a phase comparator and a voltage controlled phase shifter;
    wherein said frequency generator supplies driving signal to said reference channel and to said other channel, the system is configured to a signal from a second controller to said phase comparator and to send a phase signal from the amplitude and phase sensor of said reference PEM to said phase comparator, and said PEM of said other channel is configured to send a phase signal to said phase comparator, such that an output of said phase comparator is a phase error signal adapted for use as a feedback signal to correct phase variations of said PEM of said other channel through said voltage controlled phase shifter.

14. A system as claimed in claim 13, comprising a plurality of other channels, each including a PEM with an amplitude and phase sensor, a phase comparator and a voltage controlled phase shifter, wherein said frequency generator supplies said driving signal to all said other channels, the system is configured to send said signal from said second controller to each said phase comparator and to send said phase signal from the amplitude and phase sensor of said reference PEM each said phase comparator, and each said PEM of said other channels is configured to send a respective phase signal to its corresponding phase comparator, such that an output of each said phase comparator is a phase error signal adapted for use as a feedback signal to correct phase variations of said respective PEM of said respective other channel through said respective voltage controlled phase shifter.

15. A system as claimed in claim 13, wherein the first controller is a digital signal processor.

16. A system as claimed in claim 15, wherein the second controller comprises one or more microprocessors or programmable logic controllers.

17. A PEM comprising:
    a body in which a longitudinal standing wave is excited, said body having
    a first section comprising a driver block,
    a second section comprising an optical block, and
    a junction or mechanical step dividing said body into said driver block and said optical block; and
    one or more transducers driven by a driver with temperature responsive frequency determining electronics.

18. A PEM as claimed in claim 17, comprising a temperature response frequency control electronics circuit to control the power supply voltage to the auto-oscillation electronics to achieve the best stability of the PEM performance.

19. A PEM comprising:
    a body in which a longitudinal standing wave is excited, said body having
    a first section comprising a driver block,
    a second section comprising an optical block, and
    a junction or mechanical step dividing said body into said driver block and said optical block; and
    an independent vibration sensor isolated from any other transducers, for sensing phase and amplitude of transverse perturbations of said body.

20. A PEM as claimed in claim 19, wherein said sensor is located in a region of maximum strain on a section of said body in which a driving transducer is located.

21. A PEM as claimed in claim 19, wherein said sensor is located in a region of maximum strain on a section of said body that has an optical aperture.

22. A PEM comprising:
    a body in which a longitudinal standing wave is excited, said body having
    a first section comprising a driver block,
    a second section comprising an optical block, and
    a junction or mechanical step dividing said body into said driver block and said optical block; and
    a temperature sensor located close to but not in contact with said body of said PEM for providing a signal indicative of temperature to a frequency generator.

23. A PEM comprising:
    a body in which a longitudinal standing wave is excited, said body having
    a first section comprising a driver block,
    a second section comprising an optical block, and
    a junction or mechanical step dividing said body into said driver block and said optical block; and
    a temperature sensor located close to and in contact with said body for providing a signal indicative of temperature to a frequency generator.

24. A PEM comprising:
a body in which a longitudinal standing wave is excited, said body having
a first section comprising a driver block,
a second section comprising an optical block, and
a junction or mechanical step dividing said body into said driver block and said optical block; and
a frequency generator that comprises two crystal oscillators oscillating at two different frequencies whose difference constitutes an oscillation frequency of said body.

25. A PEM as claimed in claim 24, wherein said oscillators are maintained at a common temperature and outputs of said oscillators are fed to a mixer circuit to extract a lower beat frequency.

26. A PEM comprising:
a body in which a longitudinal standing wave is excited, said body having
a first section comprising a driver block,
a second section comprising an optical block, and
a junction or mechanical step dividing said body into said driver block and said optical block;
a powering circuit that receives a frequency signal from a frequency generator; and
wherein said powering circuit includes an electrical level comparator or an error detector with an output configured to control an output of said powering circuit with reference to a reference signal from a digital signal processor.

27. A PEM comprising:
a body in which a longitudinal standing wave is excited, said body having
a first section comprising a driver block,
a second section comprising an optical block, and
a junction or mechanical step dividing said body into said driver block and said optical block;
a powering circuit that receives a frequency signal from a frequency generator; and
wherein said powering circuit includes a phase comparator and a shifter for tracking a reference phase to within a predefined tolerance.

28. A PEM comprising:
a body in which a longitudinal standing wave is excited, said body having
a first section comprising a driver block,
a second section comprising an optical block, and
a junction or mechanical step dividing said body into said driver block and said optical block;
a powering circuit that receives a frequency signal from a frequency generator; and
wherein said powering circuit includes a preset type controller configured to receive predetermined information about optical retardation and optical wavelength and output a reference signal derived therefrom for controlling said powering circuit.

29. A PEM as claimed in claim 28, wherein said preset type controller comprises a digital signal processor or a programmable logic controller.

30. A PEM, comprising:
at least one junction or mechanical step within a body of said PEM and dividing said PEM into two sections; and
at least one amplitude and phase sensor located in an area of maximum strain.

31. A PEM, comprising:
at least one junction or mechanical step within a body of said PEM and dividing said PEM into two sections; and
one or more transducers driven by a driver with temperature responsive frequency determining electronics.

32. A PEM, comprising:
at least one junction or mechanical step within a body of said PEM and dividing said PEM into two sections; and
an independent vibration sensor isolated from any other transducers, for sensing phase and amplitude of transverse perturbations of said PEM.

33. A PEM, comprising:
at least one junction or mechanical step within a body of said PEM and dividing said PEM into two sections; and
a temperature sensor located close to but not in contact with said body of said PEM for providing a signal indicative of temperature to a frequency generator.

34. A PEM, comprising:
at least one junction or mechanical step within a body of said PEM and dividing said PEM into two sections; and
a temperature sensor located close to and in contact with said body of said PEM for providing a signal indicative of temperature to a frequency generator.

35. A PEM, comprising:
at least one junction or mechanical step within a body of said PEM and dividing said PEM into two sections; and
a frequency generator that comprises two crystal oscillators oscillating at two different frequencies whose difference constitutes an oscillation frequency of said PEM.

36. A PEM, comprising:
at least one junction or mechanical step within a body of said PEM and dividing said PEM into two sections; and
a powering circuit that receives a frequency signal from a frequency generator;
wherein said powering circuit includes an electrical level comparator or an error detector with an output configured to control an output of said powering circuit with reference to a reference signal from a digital signal processor.

37. A PEM, comprising:
at least one junction or mechanical step within a body of said PEM and dividing said PEM into two sections; and
a powering circuit that receives a frequency signal from a frequency generator;
wherein said powering circuit includes a phase comparator and a shifter for tracking a reference phase to within a predefined tolerance.

38. A PEM, comprising:
at least one junction or mechanical step within a body of said PEM and dividing said PEM into two sections; and
a powering circuit that receives a frequency signal from a frequency generator;
wherein said powering circuit includes a preset type controller configured to receive predetermined information about optical retardation and optical wavelength and output a reference signal derived therefrom for controlling said powering circuit.

39. A PEM as claimed in claim 38, wherein said preset type controller comprises a digital signal processor or a programmable logic controller.

* * * * *